US005985419A

United States Patent [19]

Schlueter, Jr. et al.

[11] Patent Number: 5,985,419

[45] Date of Patent: Nov. 16, 1999

[54] POLYURETHANE AND DOPED METAL OXIDE TRANSFER COMPONENTS

[75] Inventors: Edward L. Schlueter, Jr., Rochester; Joseph Mammino, Penfield; Gerald M. Fletcher, Pittsford; Donald S. Sypula, Penfield; James F. Smith, Ontario; Lucille M. Sharf, Pittsford; Robert M. Ferguson, Penfield, all of N.Y.

[73] Assignee: Xerox Corporation, Stamford, Conn.

[21] Appl. No.: 09/004,492

[22] Filed: Jan. 8, 1998

[51] Int. Cl.[6] .......... B32B 3/00

[52] U.S. Cl. .......... 428/195; 428/156; 428/220; 428/423.1; 428/702; 399/307; 399/308; 399/313; 399/328; 399/329; 430/126

[58] Field of Search .......... 399/328, 329, 399/307, 308, 313; 430/126; 428/195, 156, 220, 423.1, 702

[56] References Cited

U.S. PATENT DOCUMENTS

| | | | |
|---|---|---|---|
| 4,426,435 | 1/1984 | Oka | 430/132 |
| 5,147,751 | 9/1992 | Kojima et al. | 430/125 |
| 5,249,525 | 10/1993 | Lewis et al. | 101/453 |
| 5,334,476 | 8/1994 | Yagi et al. | 430/126 |
| 5,338,587 | 8/1994 | Mammino et al. | 428/35.7 |
| 5,503,955 | 4/1996 | Snelling et al. | 430/127 |
| 5,516,458 | 5/1996 | Hemrajani | 366/336 |
| 5,525,446 | 6/1996 | Sypula et al. | 430/47 |
| 5,536,628 | 7/1996 | Wang et al. | 430/531 |
| 5,602,626 | 2/1997 | Facci et al. | 399/135 |
| 5,635,327 | 6/1997 | Fukuda et al. | 430/128 |
| 5,732,320 | 3/1998 | Domagall et al. | 399/350 |
| 5,834,080 | 11/1998 | Mort et al. | 428/36.91 |
| 5,849,399 | 12/1998 | Law et al. | 428/212 |

*Primary Examiner*—William Krynski
*Assistant Examiner*—B. Shewareged
*Attorney, Agent, or Firm*—Annette L. Bade

[57] ABSTRACT

A polyurethane transfer component useful in intermediate transfer, bias transfer, and transfix applications, the polyurethane film having electrically conductive doped metal oxide fillers, the polyurethane film having a surface resistivity of from about $10^4$ to about $10^{16}$ ohm/sq, and optionally the polyurethane film is provided on a substrate, and optionally, an outer release layer is provided on the polyurethane layer.

23 Claims, 3 Drawing Sheets

24

31

30

POLYURETHANE AND DOPED METAL OXIDE TRANSFER COMPONENTS

Attention is directed to copending application Attorney Docket Number D/95609 U.S. patent application Ser. No. 09/004,554, filed Jan. 8, 1998 entitled, "Polyimide and Doped Metal Oxide Fuser Components;" Attorney Docket Number D/95609Q1 U.S. patent application Ser. No. 09/004,209, filed Jan. 8, 1998, entitled, "Haloelastomer and Doped Metal Oxide Compositions," Attorney Docket Number D/95609Q2, U.S. patent application Ser. No. 09/004, 421, filed Jan. 8, 1998, entitled, "Haloelastomer and Doped Metal Oxide Film Components," and Attorney Docket Number D/95609Q3, U.S. patent application Ser. No. 09/004, 385, filed Jan. 8, 1998, entitled, "Polyimide and Doped Metal Oxide Intermediate Transfer Components." The disclosures each of which are hereby incorporated by reference in their entirety.

BACKGROUND OF THE INVENTION

The present invention relates generally to an imaging apparatus and transfer components thereof for use in electrostatographic, including digital, apparatuses. The transfer components herein are useful for many purposes including removing toner from a charge retentive surface and transporting it to a final image substrate, transferring toner from a charge retentive surface to a bias charging member, and in transfuse applications wherein the toner is transferred and fused to a copy substrate. More specifically, the present invention relates to transfer components comprising a polyurethane film or layer which, in embodiments, is filled with a conductive filler in order to impart desired resistivity. In specific embodiments, the conductive filler is a doped metal oxide filler, preferably antimony doped tin oxide filler. In another embodiment, the transfer components comprise a substrate, and an outer polyurethane layer provided thereon. In yet another embodiment, the transfer components comprise a substrate, a polyurethane layer provided thereon, and an outer release layer provided on the polyurethane layer. The present invention may be useful in xerographic machines, including digital, for various applications, especially for color applications.

Examples of transfer members include those described in Buchan et al., U.S. Pat. No. 3,893,761, which discloses an intermediate transfer belt having a polyimide film substrate coated with 0.1 to 10 mils of silicone rubber or a fluoroelastomer. Berkes et al., U.S. Pat. No. 5,119,140, discloses a single layer intermediate transfer belt fabricated from clear Tedlar®, carbon loaded Tedlar® or pigmented Tedlar®. Nisheise et al., U.S. Pat. No. 5,099,286, discloses an intermediate transfer belt comprising electrically conductive urethane rubber as the substrate ($10^3$ to $10^4$ ohm-cm) and a layer of polytetrafluoroethylene. Bujese, U.S. Pat. No. 5,150,161, discloses suitable materials for laminate intermediate transfer members in a color printing apparatus. Bujese et al., U.S. Pat. No. 5,208,638, discloses an intermediate transfer surface employing a conductive fluoropolymer material. Mammino et al., U.S. Pat. No. 5,298,956, discloses a reinforced seamless intermediate transfer member having embedded in the reinforcing member, filler materials and an electrical property regulating material.

Yu et al., U.S. Pat. No. 5,303,014, discloses a bias transfer member comprising a layer of resistive material ($10^{10}$ to $10^{15}$ ohms-cm) such as polyimide siloxane and polytetrafluoroethylene having fluorine atoms embedded therein. Eddy et al., U.S. Pat. No. 3,959,573 discloses biasable members having at least one layer of coating of a hydrophobic elastomeric polyurethane. Similarly, Seanor et al., U.S. Pat. No. 3,929,574 discloses biasable members having an elastomeric resilient polyurethane coating filled with ionic additives.

U.S. Pat. No. 5,576,818 discloses an intermediate transfer component having multiple coatings including a) an electrically conductive substrate, b) a conformable and electrically resistive layer comprised of a first polymeric material, and c) a toner release layer comprised of a second polymeric material. The substrate may be polyimide filled with carbon black, the intermediate layer may be fluoroelastomer, and the outer release layer may be a fluoroelastomer or fluorosilicone. U.S. Pat. No. 5,612,773 discloses a transfix configuration for a color apparatus.

It is desirable to provide a multifunctional transfer film that can be suitable for use in several areas in the electrostatographic transfer process such as intermediate transfer, bias transfer, and transfix. It is also desirable to provide such a film for use in liquid development production color machine employing image-on image technology.

For such a multifunctional transfer component, it is necessary to impart conductive properties to such components by addition of conductive fillers. Carbon black has been the chosen additive for imparting conductive properties in electrostatographic components. Carbon black is relatively inexpensive and very efficient in that a relatively small percentage can impart a high degree of conductivity. However, the blackness of this material makes it difficult and sometimes impossible to fabricate colored products with the desired level of conductivity. Further, components filed with carbon black have a tendency to slough and thereby contaminate their surroundings with black, conductive debris.

Many doped metal oxides offer significant advantages in both color and transparency when compared to carbon black. They are, however, relatively expensive and usually require higher dosages to achieve comparable levels of conductivity. In addition, dispersion of metal oxides can lead to short comings in surface roughness and particle size.

Therefore, a need remains for conductive transfer components for use in electrostatographic or digital machines, wherein the component possesses desired resistivity without the drawbacks of lack of transparency of the film or layer which may adversely affect use in color products. Further, a need remains for a conductive transfer component having conductive fillers which impart the desired resistivity without compromising surface roughness. Further, a need remains for films having improved mechanical properties to maintain film or belt integrity for improved flex life and image registration, improved electrical properties including a resistivity within the range desired for superior performance and to control electrostatic transfer functions, improved chemical stability to liquid developer or toner additives, improved thermal stability for transfix operations, improved conformability, low surface energy, and higher modulus. Further, a need exists for a film or component in which the resistivity is uniform and is relatively unaffected by changes in environmental conditions such as changes in humidity, temperature, electrical surges, and the like. Many of these objects have been met by various embodiments of the present invention.

SUMMARY OF THE INVENTION

The present invention provides, in embodiments, a transfer film component comprising a polyurethane film and electrically conductive doped metal oxide fillers, wherein said polyurethane film has a surface resistivity of from about $10^4$ to about $10^{16}$ ohm/sq.

The present invention further provides, in embodiments, a bias transfer member for use in an electrostatographic printing apparatus for transferring electrically charged particles from an image support surface to said biasable transfer member, wherein said biasable transfer member comprises a polyurethane film and electrically conductive doped metal oxide fillers, wherein said polyurethane film has a surface resistivity of from about $10^4$ to about $10^{16}$ ohm/sq.

Additionally, the present invention includes, in embodiments, an image forming apparatus for forming images on a recording medium comprising: a charge-retentive surface to receive an electrostatic latent image thereon; a development component to apply toner to said charge-retentive surface to develop said electrostatic latent image to form a developed image on said charge retentive surface; a transfer film component to transfer the developed image from said charge retentive surface to a copy substrate; said transfer film component comprising a polyurethane film substrate and electrically conductive doped metal oxide fillers, wherein said polyurethane film has a surface resistivity of from about $10^4$ to about $10^{16}$ ohm/sq.

Moreover, the present invention includes, in embodiments, an image forming apparatus for forming images on a recording medium comprising: a charge-retentive surface to receive an electrostatic latent image thereon; a development component to apply toner to said charge-retentive surface to develop said electrostatic latent image to form a developed image on said charge retentive surface; a bias transfer film component for transferring electrically charged particles from said charge retentive surface to said bias transfer film component, wherein said bias transfer film component comprises a polyurethane film substrate and electrically conductive doped metal oxide fillers, wherein said polyurethane film has a surface resistivity of from about $10^4$ to about $10^{16}$ ohm/sq.

BRIEF DESCRIPTION OF THE DRAWINGS

The above aspects of the present invention will become apparent as the following description proceeds upon reference to the drawings in which.

DETAILED DESCRIPTION OF THE INVENTION

The present invention is directed to transfer components which include bias transfer, pressure transfer, transfix components, intermediate transfer, and the like. In one embodiment of the present invention, the transfer film component comprises a substrate which comprises a polyurethane having electrically conductive doped metal oxide fillers dispersed therein. In another embodiment, the transfer component comprises a substrate optionally having electrically conductive fillers dispersed or contained therein, and an outer conformable polyurethane and doped metal oxide layer provided thereon. In still another embodiment, the present invention relates to a film component comprising a substrate optionally having electrically conductive particles dispersed or contained therein, a conformable/electrical polyurethane and doped metal oxide layer provided on the substrate, and an outer release layer provided on the electrical/conformable layer.

Figure 1:
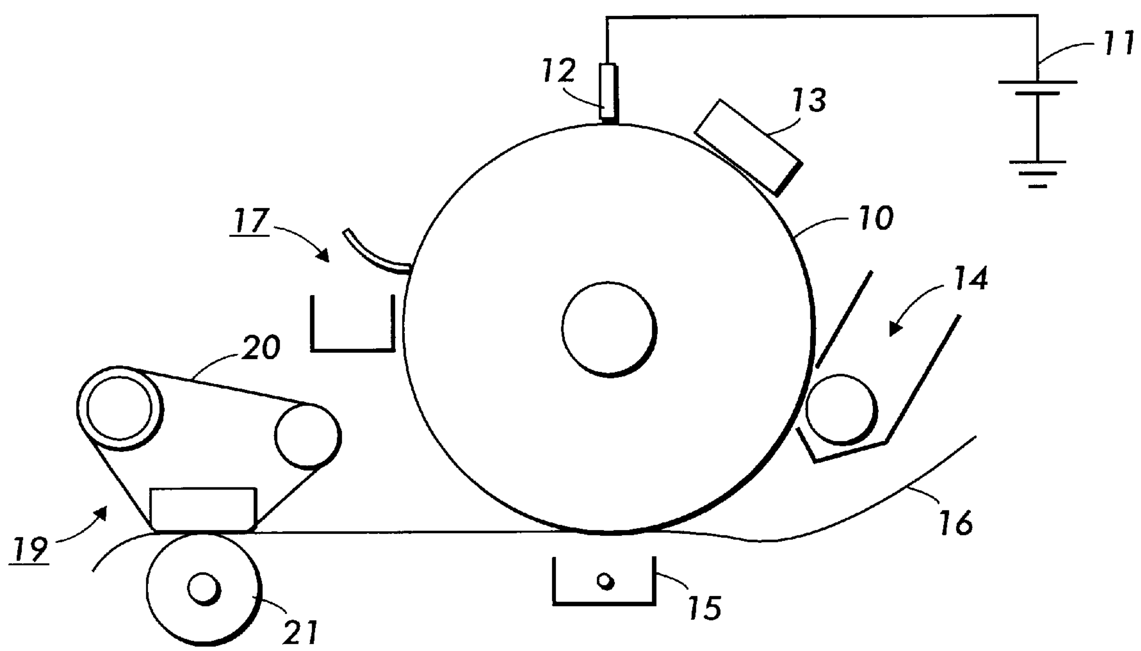
FIG. 1 is a schematic illustration of an image apparatus in accordance with the present invention.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser belt 20 and pressure roll 21 (although any other fusing components such as fuser roll in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

The transfer film component employed for the present invention can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like.

The transfer film components of the instant invention may be employed in either an image on image transfer, or a tandem transfer of a toned image(s) from the photoreceptor to the intermediate transfer component, or in a transfix system for simultaneous transfer and fusing the transferred and developed latent image to the copy substrate. In an image on image transfer, the color toner images are first deposited on the photoreceptor and all the color or toner images are then transferred simultaneously to the intermediate transfer component. In a tandem transfer, the toner image is transferred one color at a time from the photoreceptor to the same area of the intermediate transfer component.

Transfer of the developed image from the imaging member to the intermediate transfer element and transfer of the image from the intermediate transfer element to the substrate can be by any suitable technique conventionally used in electrophotography, such as corona transfer, pressure transfer, bias transfer, and the like, and combinations of those transfer means. In the situation of transfer from the intermediate transfer medium to the substrate, transfer methods such as adhesive transfer, wherein the receiving substrate has adhesive characteristics with respect to the developer material, can also be employed. Typical corona transfer entails so contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically, four image forming devices are used. The image forming devices may each comprise an image receiving member in the form of a photoreceptor or other image receiving member. The intermediate transfer member of an embodiment of the present invention, is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

The intermediate transfer member moves such that each incremental portion thereof first moves past an image forming component and comes into contact with a developed color image on an image receiving member. A transfer device, which can comprise a corona discharge device, serves to effect transfer of the color component of the image at the area of contact between the receiving member and the intermediate transfer member. In a like fashion, image components of colors such as red, blue, brown, green, orange, magenta, cyan, yellow and black, corresponding to the original document also can be formed on the intermediate transfer member one color on top of the other to produce a full color image.

A transfer sheet or copy sheet is moved into contact with the toner image on the intermediate transfer member. A bias transfer member may be used to provide good contact between the sheet and the toner image at the transfer station. A corona transfer device also can be provided for assisting the bias transfer member in effecting image transfer. These imaging steps can occur simultaneously at different incremental portions of the intermediate transfer member. Further details of the transfer method employed herein are set forth in U.S. Pat. No. 5,298,956 to Mammino, the disclosure of which is hereby incorporated by reference in its entirety.

The transfer member can be employed in various devices including, but not limited to, devices described in U.S. Pat. Nos. 3,893,761; 4,531,825; 4,684,238; 4,690,539; 5,119,140; and 5,099,286; the disclosures each of which are hereby incorporated by reference in their entirety.

Bias transfer is another method of effecting transfer of a developed image from one member to another. The process of transferring toner materials via a bias transfer system in an electrostatographic apparatus involves the physical detachment and transfer over of charged particulate toner material from a first image support surface (i.e., a photoreceptor) into attachment with a second image support substrate (i.e., a copy sheet or intermediate transfer member) under the influence of electrostatic force fields generated by an electrically biased member and charge being deposited on the second image support substrate by, for example, a bias transfer belt or film or roll, or by spraying the charge on the back of the substrate. The bias transfer films are configured so as to include an inner conductive member having at least one layer of high electrical resistance material, for transferring a toner powder image from the photoreceptor onto a print receiving web, for charging the back side of a substrate, or charging the photoreceptor prior to the exposure of the original document to form an electrostatic latent image on the photoreceptor. Further data concerning bias roll transfer methods is provided in, for example, U.S. Pat. Nos. 3,847,478, 3,942,888, and 3,924,943, the disclosures of each of which are totally incorporated herein by reference.

Figure 5:
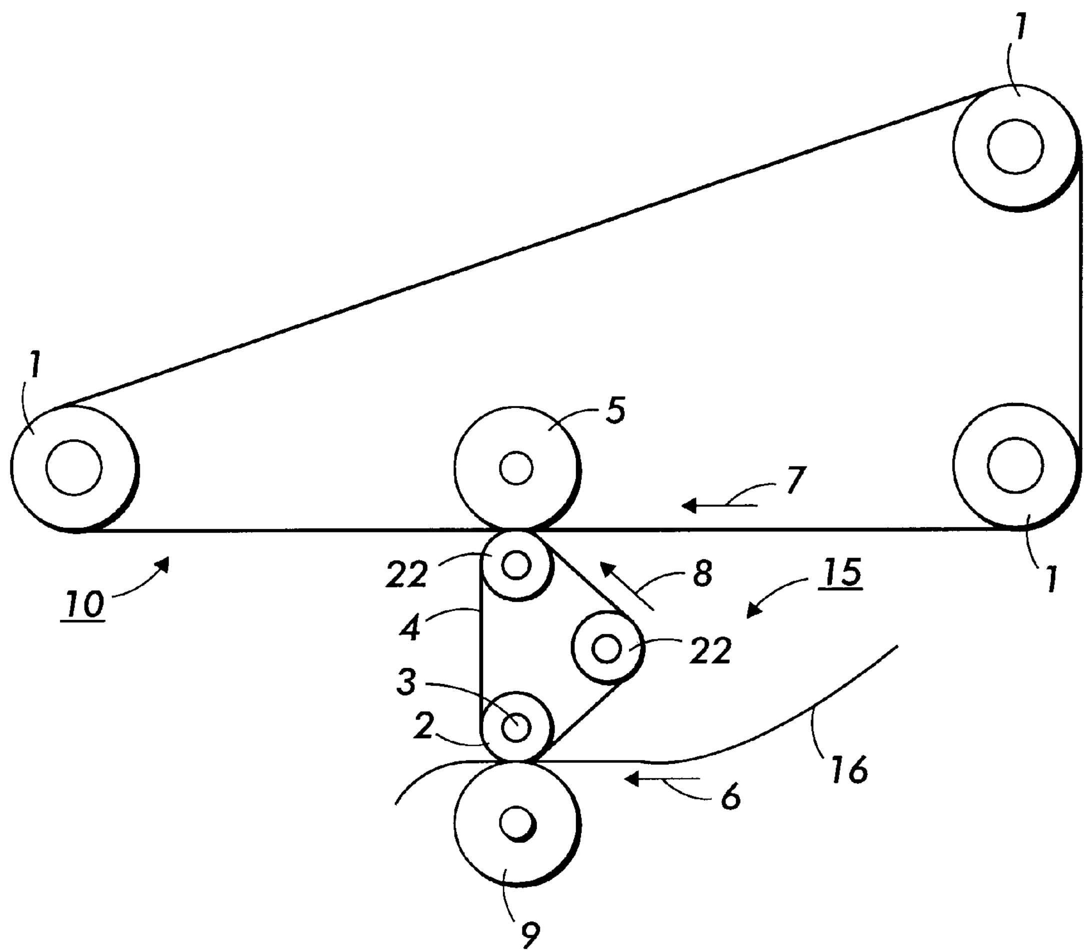
FIG. 5 is an illustration of an embodiment of the present invention, and represents a transfix belt having a one layer configuration.

Transfer and fusing may occur simultaneously in a transfix configuration. As shown in FIG. 5, a transfer apparatus 15 is depicted as transfix belt 4 being held in position by driver rollers 22 and heated roller 2. Heated roller 2 comprises a heater element 3. Transfix belt 4 is driven by driving rollers 1 in the direction of arrow 8. The developed image from photoreceptor 10 (which is driven in direction 7 by rollers 1) is transferred to transfix belt 4 when contact with photoreceptor 10 and belt 4 occurs. Pressure roll 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roll 9. A nip is formed by heated roll 2 with heating element 3 contained therein and pressure roll 9. Copy substrate 16 passes through the nip formed by heated roll 2 and pressure roll 9, and simultaneous transfer and fusing of the developed image to the copy substrate 16 occurs.

An important aspect of the transfer process focuses on maintaining the same pattern and intensity of electrostatic fields as on the original latent electrostatic image being reproduced to induce transfer without causing scattering or smearing of the developer material. This important and difficult criterion is satisfied by careful control of the electrostatic fields, which, by necessity, should be high enough to effect toner transfer while being low enough to not cause arcing or excessive ionization at undesired locations. These electrical disturbances can create copy or print defects by inhibiting toner transfer or by inducing uncontrolled transfer which can easily cause scattering or smearing of the development materials.

In the pretransfer air gap region, or the so-called prenip region immediately in advance of copy sheet contact with the image, excessively high transfer fields can result in premature toner transfer across the air gap, leading to decreased resolution or blurred images. High transfer fields in the prenip air gap can also cause ionization, which may lead to loss of transfer efficiency, strobing or other image defects, and a lower latitude of system operating parameters. Conversely, in the post transfer air gap region or the so-called postnip region at the photoconductor-copy sheet separation area, insufficient transfer fields can give rise to image dropout and may generate hollow characters. Improper ionization in the postnip region may also create image stability defects and can give rise to copy sheet separation problems. One overriding consideration is providing an effective transfer system that focuses on the transfer field generated in the transfer region which must be maximized in the area directly adjacent the transfer nip where the copy paper contacts the image so that high transfer efficiency and stable transfer can be achieved. Therefore, acceptable transfer field by controlling the resistivity range at the pre and post nip areas is important for effective transfer.

The polyurethane as a substrate or layer in the above transfer configurations of the present invention can be any suitable polyurethane capable of becoming a conductive film upon the addition of electrically conductive particles. A polyurethane having a high elastic modulus is preferred because the high elastic modulus minimizes film stretch to optimize registration and transfer or transfix conformance. The polyurethane used herein has the advantages of improved flex life and image registration, chemical stability to liquid developer or toner additives, improved overcoating manufacturing, improved solvent resistance as compared to known materials used for film transfer components, and improved electrical properties including a uniform resistivity within the desired range.

Urethanes are typically formed by the reaction of a polyisocyanate and a compound containing hydroxyl groups according to the general reaction: $R_aNCO+R_bOH \rightarrow R_aNHCOOR_b$, wherein $R_b$ is an ester for the formation of a polyester urethane and an ether for the formation of a polyether urethane. Other suitable polyurethanes comprise caprolactone polymers. A curing or crosslinking agent is usually added. In addition, a catalyst may be added to speed up the reaction and crosslinking.

Examples of suitable polyisocyanates include the diisocyanates elected from the group consisting of diphenylmethane diisocyanates or ethylene diisocyanate (MDI), toluene diisocyanates (TDI), naphthalene diisocyanates (NDI), meta and para tetramethylenezylene diisocyanate (TMXDI), isophorone diisocyanate (IPDI), and blends thereof. The diisocyanates are used in an amount of from about 3 to about 95 percent by weight and preferred is from about 10 to about 75 percent by weight of total solids. Total solids as used herein refers to the total percentage by weight of diisocyanate, polyol, crosslinking agent and optional catalyst. Specific diisocyanates useful in the practice of the present invention include 4,4'diphenylmethane diisocyanate, 2,4'diphenylmethane diisocyanate, 2,2'diphenylmethane diisocyanate, 2,4-toluene diisocyanate, 2,6-toluene diisocyanate, naphthalene 1,5-diisocyanate, 2,4-toluenediisocyanate, 1,5-naphthalenediisocyanate, hexamethylene diisocyanate, HDI hydride, diphenylmethane-4,4'diisocyanate, an polyfunctional modified polyisocyanate, as well as their isomers, and mixtures thereof. A preferred blend of diisocyanate is one containing 98 percent 4,4'diphenylmethane diisocyanate and 2 percent 2,4'diphenylmethane diisocyanate available under the trademark ISOCYANATE® 125M from Dow Chemical Company, Midland, Mich.

Examples of suitable polyols include polyols useful in polyether urethanes such as polypropylene-based polyetherpolyol, polyethylene-based polyetherpolyol, polytetramethylene-based polyetherpolyol, copolymerized polyether-based polyol, and mixtures of these polyol components; and polyols useful in polyester urethanes such as adipate-based polyesterpolyol, lactone-based polyester polyol, copolymerized polyesterpolyol, polycarbonate-based polyol, polypropylene-based polyetherpolyol, polyethylene-based polyetherpolyol, polytetramethylene-based polyetherpolyol, copolymerized polyether-based polyol, and mixtures of these polyol components.

It is preferred to react the polyol and the polyisocyanate to form a prepolymer before reacting with a crosslinking agent. Preferred prepolymers include an MDI based polytetramethylene glycol which has a molecular weight of about 1000 and an NCO content of from about 10.9 to about 11.5, preferably about 11.3 and is available under the tradename Uniroyal VIBRATHANE® B670 from Uniroyal; a TDI based polypropylene glycol B690 which has a molecular weight of about 1000 and an NCO content of from about 3.85 to about 4.15 and is available from Uniroyal; and an MDI based polytetramethylene glycol B960 which has a molecular weight of about 880 and an NCO content of about 9.5 and is available from Uniroyal. The functional NCO groups of the prepolymer provide a relatively hard and rigid segment in the final polymer chain and act very much like a filler to provide a tough but flexible structure that has both hard and soft domains. The NCO content as used herein is defined as the isocyanate content which is a measurement of the reactive groups left on the prepolymer to form a polymer or crosslinked network.

Chain extenders in embodiments of the present invention, such as bifunctional or trifunctional extenders which act as crosslinking agents, are used herein. Typically, suitable bifunctional crosslinking agents are of the formula $OH(R_1)OH$ where $R_1$ is a straight or branched chain alkyl group having from about 2 to about 12 carbon atoms, such as methyl, ethyl, butyl, tert-butyl, and the like. Suitable trifunctional crosslinking agents are generally of the formula $R'—C—[—(OH)_a(CH_2OH)_b]$ where R' is H, $CH_3$ or $C_2H_5$, a is a number 0 or 1, b is a number 2 or 3 and a+b=3. Typical bifunctional chain extenders include ethylene glycol, 1,4 butanediol (BDO), 1,3 butanediol, 1,6 hexanediol; and neopentyl glycol, because these crosslinking agents extend the polymer chain linearly yielding tough wear resistant materials. Examples of trifunctional and higher functional chain extenders include hydroquinonediethylolether, bisphenol A, glycerol, trimethylolpropane (TMP), and trimethylolethane primarily because they crosslink the polymer chains at 90° and yield very set resistant networks. Preferred chain extenders include 1,4 butanediol; 1,6 hexanediol; 1,3 butanediol; trimethylolpropane; trimethylolethane; and commercially available chain extenders which contain a mixture of diol(s) and triol(s) such as, for example, the commercially available extender A-931 available from Uniroyal which is a diol, triol and amine blend to increase chain crosslinking. The bifunctional butanediol acts to extend the chain in a linear way to provide linear soft sites thereby providing the greatest toughness in the final elastomer. Trifunctional trimethylolpropane provides superior compression set performance primarily because it is trifunctional and provides crosslinking exchange sites to tighten up the network, thereby providing a crosslinked three-dimensional network. The total amount of combined crosslinking agents is from about 5 to about 20 percent by weight, preferably from about 8 to about 18 percent by weight, and particularly preferred of about 14 weight percent based on the weight of total solids.

Typical conventional catalysts include tin derivatives such as dibutyltindilaurate and stannous octoate; mercury derivatives such as phenylmercuric acetate and tertiary amines such as Polycat 33, Polycat 41, Polycat 70 and Polycat 77, which are used in conventional amounts, typically from about 0 to about 20 percent by weight, preferably from about 5 to about 10 percent by weight of total solids.

A commercial material is available which includes a mixture of an aqueous urethane dispersion of BAYHYDROL® 121 (Bayer) and an aqueous dispersion of antimony tin oxide OPDU1005® which can be purchased from MEI (Magnesium Electron Inc). This material contains antimony doped tin oxide, urethane polymer and a solvent vehicle. The formulation is about 24 percent by total weight filler, about 17 percent by total weight polymer, and about 59 percent by total weight solvent.

The polyurethane is present in the film in an amount of from about 95 to about 35 percent by weight of total solids, preferably from about 90 to about 70 percent by weight of total solids. Total solids as used herein includes the total percentage by weight of polymer, conductive fillers and any additives in the layer.

Figure 2:
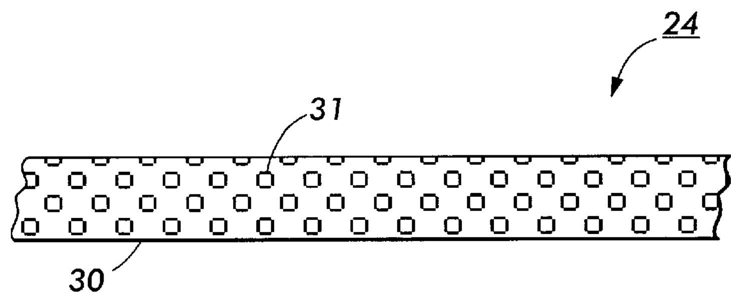
FIG. 2 is a schematic illustration of an embodiment of the present invention, and represents a transfer belt in accordance with the present invention having a one layer configuration.

The transfer component of the present invention may be in the form of a nonconformable transfer or transfix component. In this embodiment as shown in FIG. 2, the transfer or transfix component is in the form of film 24 comprising a polyurethane layer 30 having electrically conductive doped metal oxide fillers 31 dispersed therein. The single layer film preferably has a thickness of from about 75 to about 1,500 $\mu$m, preferably from about 250 to about 750 $\mu$m. This conformable layer has a modulus of from about 500 PSI to about 300,000 PSI.

The one-layer film herein, preferably in the form of a belt, has a width, for example, of from about 300 to about 2,000 mm, preferably from about 300 to about 900 mm. The circumference of the non-conformable film is from about 500 to about 3,600 mm, preferably from about 525 to about 1,100 mm.

The one layer film member may be prepared adding an appropriate amount of filler is to the film or component layer mixture in order to provide a surface resistivity of from about $10^4$ to about $10^{16}$, preferably from about $10^6$ to about $10^{14}$, and particularly preferred of from about $10^8$ to about $10^{12}$ ohms/sq. The filler is added and the mixture is pebble milled in a roller mill, attritor or sand mill. After addition of the filler particles, the polyurethane layer may be formed by extrusion into a sheet or into an endless loop by known methods. If not, the two ends of the member can be joined by heat or pressure and the resulting seam can be coated with an adhesive filler material and/or sanded to produce a seamless component by mechanical devices such as a pad or roller with single or multiple grades or abrasive surfaces, a skid plate, electronic laser ablation mechanism or chemical treatment as practiced in the art. In a preferred embodiment of the invention, the film is in the form of an endless seamed or seamless belt. The seam may impart a puzzle cut configuration as described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

Figure 3:
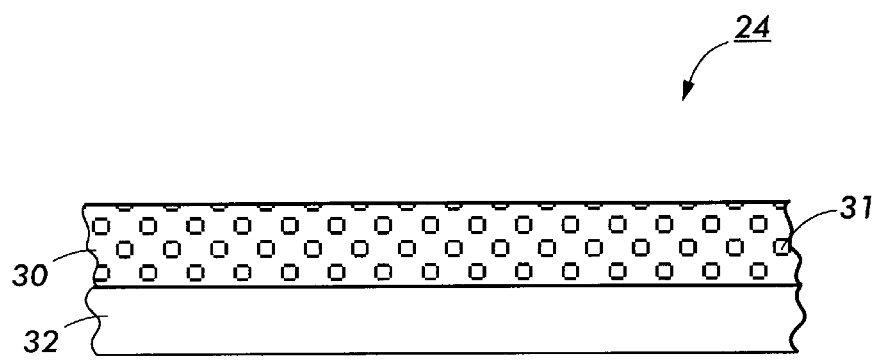
FIG. 3 is an illustration of an embodiment of the present invention, and represents a transfer belt in accordance with the present invention having a two layer configuration.

In another embodiment of the invention as shown in FIG. 3, the transfer or transfix component is in the form of film 24 of a two layer configuration. The transfer component 24 comprises a polyurethane outer layer 30 having electrically conductive doped metal oxide fillers 31 dispersed therein. A substrate 32 is positioned under the polyurethane layer 30. The substrate imparts mechanical strength and the outer layer imparts conformability and electrical conductivity to a wide range of toner pile heights for superior transfer.

Preferred materials for the substrate 32 include relatively low surface energy materials such as fluoropolymers such as polytetrafluoroethylene (PTFE), fluorinated ethylenepropylene copolymer (FEP), polyfluoroalkoxypolytetrafluoroethylene (PFA Teflon) and other TEFLON®-like materials; silicone materials such as fluorosilicones and silicone rubbers such as silicone rubber 552, available from Sampson Coatings, Richmond, Va., (polydimethyl siloxane/dibutyl tin diacetate, 0.45 g DBTDA per 100 grams polydimethyl siloxane rubber mixture, with molecular weight of approximately 3,500); surface treated polyimides such as PAI (polyamide imide), PI (polyimide), polyaramide, polyphthalamide, and those polymers sold under the tradename KALREZ® available from DuPont; and fluoroelastomers such as those sold under the tradename VITON® such as copolymers and terpolymers of vinylidenefluoride, hexafluoropropylene and tetrafluoroethylene, which are known commercially under various designations as VITON A®, VITON E®, VITON E60C®, VITON E430°, VITON B910®, VITON GH®, VITON B50®, VITON E45®, and VITON GF®. The VITON® designation is a Trademark of E. I. DuPont de Nemours, Inc. Two preferred known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoroide, hexafluoropropylene, tetrafluoroethylene and a cure site monomer. VITON A®, and VITON B®, and other VITON® designations are trademarks of E. I. DuPont de Nemours and Company. In another preferred embodiment, the fluoroelastomer is a tetrapolymer having a relatively low quantity of vinylidenefluoride. An example is VITON GF®, available from E. I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1,1,1-dihydro-4-bromoperfluorobutene-1,3-bromoperfluoropropene-1,3-bromoperfluoropropene-1,1,1-dihydro-3-bromoperfluoropropene-1, or any other suitable, known, commercially available cure site monomer.

The polyurethane outer layer of the two layer configuration has the properties as described above for the one layer configuration. The substrate of the two layer configuration has a hardness of from about 50 to about 80 Shore A, preferably from about 60 to about 70 Shore A. The thickness of the substrate layer in the two layer configuration is from about 2 to about 6,000 $\mu$m, preferably from about 10 to about 1500 $\mu$m.

The outer layer is coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, molding, laminating, and the like. It is preferred to spray or flow coat the outer material when the thickness desired is about 125 $\mu$m.

Figure 4:
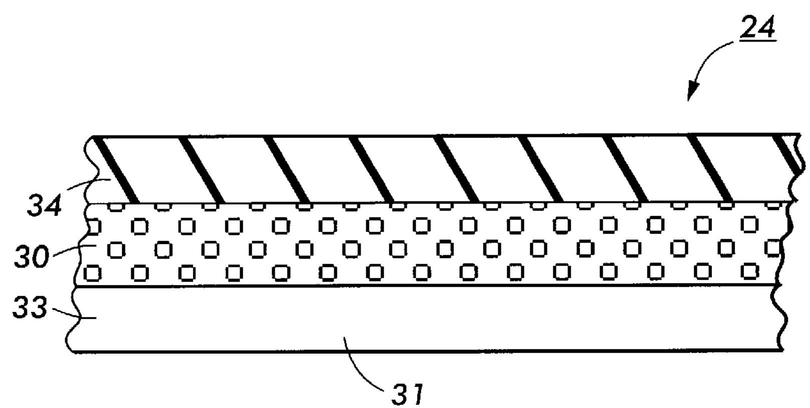
FIG. 4 is an illustration of an embodiment of the present invention, and represents a transfer belt in accordance with the present invention having a three layer configuration.

In a third embodiment as depicted in FIG. 4, the transfer or transfix component is in the form of film 24 of a three layer configuration and comprises a substrate layer 33, a polyurethane intermediate layer 30 having electrically conductive doped metal oxide fillers 31 dispersed or contained therein, and an outer layer release layer 34 provided on the intermediate layer 30.

Preferably, the a outer release layer comprises a material having a hardness of from about 40 to about 90 Shore A, preferably from about 50 to about 60 Shore A; a thickness of from about 2 to about 6,000 $\mu$m, and preferably from about 25 to about 1500 $\mu$m; with electrical properties similar to the substrate material. The intermediate layer preferably has requirements that it is able to adhere both to the outer layer and to the substrate material. Materials suitable for the outer layer include silicone rubbers as set forth above, fluoroelastomers as described above, urethane nitrites, ethylene propylene diene monomers (EPDM), conformable fluoropolymers as described above, other high surface energy materials, and any other material capable of meeting the temperature and conformability requirements. The intermediate layers may be applied as preformed sheets or films using known lamination processes. The substrate and intermediate layers are as described above for the substrate and intermediate layers for the two layer configuration. This three layer configuration provides superior conformability and is suitable for use in color xerographic machines.

The polymers of the substrate and outer layers of the three layer configuration are preferably present in the respective layers in an amount of from about 60 to about 99.9 percent, and preferably from about 80 to about 90 percent by weight of total solids.

The transfer or transfix film employs electrically conductive particles dispersed in the polyurethane film or in the substrate film. These electrically conductive particles decrease the base material resistivity into the desired surface resistivity range of from about $10^4$ to about $10^{16}$, preferably from about $10^6$ to about $10^{14}$, and more preferably from about $10^8$ to about $10^{12}$ ohms-sq. The desired volume resistivity is from about $10^4$ to about $10^{11}$, preferably from about $10^7$ to about $10^{11}$ ohm-cm. The desired resistivity can be provided by varying the concentration of the conductive filler. It is important to have the resistivity within this desired range. The transfer film component will exhibit undesirable effects if the resistivity is not within the required range, including nonconformance at the contact nip, poor toner releasing properties resulting in copy contamination, and generation of contaminant during charging. Other problems include resistivity that is susceptible to changes in temperature, relative humidity, running time, and leaching out of contamination to photoconductors. The substrate material and intermediate layer material preferably possess the desired resistivity enabling a field to be created for transfer, and discharge of the field before the next imaging cycle. The field created preferably is able to transfer dry toner or liquid ink from one substrate to another. Further, the preferred outer layer is preferably thin enough to create and dissipate a field, yet insulative enough to prevent electrical shorts from pin holes in transferring substrates. It is desired that the polyurethane layer and outer layers of the transfer or transfix films have resistivity falling within the ranges disclosed above.

Preferably, a doped metal oxide is contained or dispersed in the polyurethane layer. The doped metal oxide can also be contained or dispersed in any of the layers. Preferred doped metal oxides include antimony doped tin oxide, aluminum doped zinc oxide, antimony doped titanium dioxide, similar doped metal oxides, and mixtures thereof.

In a particularly preferred embodiment of the invention, the doped metal oxide is added to the polyurethane layer (or other layer) in an amount of about 1 to about 65 percent by weight of total solids, preferably from about 5 to about 30 percent by weight of total solids, and particularly preferred of from about 5 to about 10 percent by weight of total solids. Total solids is defined as the amount of polymer, filler(s), and any additives.

Other conductive fillers can be added to the polyurethane layer or other layers. Examples of additional conductive fillers include carbon blacks and graphite; and metal oxides such as tin oxide, antimony dioxide, titanium dioxide, indium oxide, zinc oxide, indium oxide, indium tin trioxide, and the like; and mixtures thereof. The additional filler (i.e., fillers other than doped metal oxide fillers) may be present in an amount of from about 1 to about 40 and preferably from about 4 to about 20 parts by weight of total solids.

In a preferred embodiment of the invention, the electrically conductive filler is antimony doped tin oxide. Suitable antimony doped tin oxides include those antimony doped tin oxides coated on an inert core particle (e.g., ZELEC® ECP-S, M and T) and those antimony doped tin oxides without a core particle (e.g., ZELEC® ECP-3005-XC and ZELEC® ECP-3010-XC). ZELEC® is a trademark of DuPont Chemicals Jackson Laboratories, Deepwater, N.J. Also, an aqueous dispersion of antimony tin oxide OPDU1005® can be purchased from Magnesium Electron, Inc. The core particle may be mica, $TiO_2$ or acicular particles having a hollow or a solid core.

In a preferred embodiment, the antimony doped tin oxides are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the outer particles are fine enough in size to provide adequate transparency. The silica may either be a hollow shell or layered on the surface of an inert core, forming a solid structure.

Preferred forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. The structure of the ZELEC® ECP powder includes fine crystallites of antimony doped tin oxide densely layered onto the surface of a silica based particle. The crystallites of the conductor are dispersed in such a fashion that they form a dense conductive surface on the silica layer, which insures optimal conductivity. The silica of the ZELEC® ECP may be structured either as a hollow shell or it may be layered on the surface of another inert core, making it a solid striker. There are three commercial grades of ZELEC® ECP powders including an acicular, hollow shell product (ZELEC® ECP-S), an equiaxial titanium dioxide core product (ZELEC ECP-T), and a plate shaped mica core product (ZELEC® ECP-M). The following Tables demonstrate the product properties of ZELEC® ECP. This information was taken from a DuPont Chemicals Jackson Laboratories, Deepwater, N.J., product brochure.

TABLE 1

Product Physical Properties (S, T & M)

| Property | Core | Shape | Mean Part. Size |
|---|---|---|---|
| ECP-S | Hollow | Acicular | 3 microns |
| ECP-T | Solid | Equiaxial | 1 micron |
| ECP-M | Solid | Platelike | 10 microns |

TABLE 2

Product Chemical Properties (S, T & M)

| Property | ECP-S | ECP-T | ECP-M |
|---|---|---|---|
| Bulk Density | 0.4 gm/cc | 1.0 gm/cc | 0.6 gm/cc |
| Specific gravity | 3.9 gm/cc | 4.9 gm/cc | 3.9 gm/cc |
| Surface area | 50 $m^2$/gm | 20 $m^2$/gm | 30 $m^2$/gm |
| Mean part. size | 3 microns | 1 micron | 10 micron |
| Dry powder resist | 2–30 ohm-cm | 2–30 ohm-cm | 20–300 ohm-cm |
| Core | Hollow | $TiO_2$ | Mica |

TABLE 3

Product Properties (XC)

| Property | 3005-XC | 3010-XC |
|---|---|---|
| Antimony % | 6.5 | 10 |
| Bulk powder resist. | .5 to 3 ohm-cm | .5 to 3 ohm-cm |
| Specific gravity | 6.5 to 7.5 gm/cc | 6.5 to 7.5 gm/cc |
| Surface area | 15 to 30 $m^2$/gm | 60 to 80 $m^2$/gm |
| Particle size (D50) | .7 microns | 2 microns |

Optionally, any known and available suitable adhesive layer may be positioned between the polyurethane layer and the substrate in the two layer configuration. An adhesive may be positioned between the polyurethane intermediate layer and the substrate and/or between the polyurethane layer and the release layer in the three layer configuration.

Examples of suitable adhesives include Dow Corning® A 4040 prime coat, which is especially effective when used with fluorosilicone layers, and Dow Tactix® blends, Ciba-Geigy Araldite® MY-721 and Morton Thixon 330/311, all of which are suitable for use with fluoropolymer and silicone rubber layers. Other suitable adhesives include acrylates, polyesters, cyanoacrylates, and also pressure sensitive adhesives. The adhesive may have the same electrical properties as the substrate, polyurethane or outer layer.

Additives and additional fillers may be present in any of the above-described layers. Additives include dispersing agents, rheology control agents, various pigment fillers which may be ionic in nature and also exhibit electrical regulating properties, tensile modulus enhancing materials such as fibers, wax fluoropolymer pigments, and colorants.

Specific embodiments of the invention will now be described in detail. These examples are intended to be illustrative, and the invention is not limited to the materials, conditions, or process parameters set forth in these embodiments. All parts are percentages by total solid weight unless otherwise indicated.

EXAMPLES

Example 1

Single Layer Transfer Material

Antimony doped tin oxide in an aqueous dispersion available from Magnesium Electron, Inc. (OPDU1005® which can be purchased from Magnesium Electron Inc.). This composition contains antimony doped tin oxide, urethane polymer and a solvent vehicle. The formulation is about 24 percent filler, about 17 percent polymer, and about 59 percent solvent by total composition weight. This composition was added in amounts of 0 and 20 percent by weight of total solids to aqueous dispersions of urethane (from about 100 to about 80 percent by weight BAYHYDROL® 121 or BAYHYDROL® 110 from Miles, Inc., Pittsburg, Pa.). In the final mixture containing the antimony doped tin oxide (20 percent by weight of OPDU1005®), the antimony doped tin oxide is present in an amount of about 5 percent by weight of total solids. The mixtures were prepared into films using a Bird applicator. The dispersions were then air dried and cured until the coating was a continuous film. The films were then coated using a lab coater referred to as a Laboratory Draw Down Coater LC100 from Chemsultants International in Menter, Ohio, to a thickness of from about 25 $\mu$m to about 125 $\mu$m.

Resistivity testing of the films was then accomplished by known methods. By use of 0 percent antimony doped tin oxide, the resistivity was $10^{14,}$ and by use of 20 percent antimony doped tin oxide, the resistivity was measured at $10^7$ ohms/sq. These results demonstrated that upon a change in weight percentage of antimony doped tin oxide of from about 0 to about 20 weight percent, the resistivity changed to from about $10^{14}$ to about $10^7$ ohms/sq.

Example 2

Two Layer Transfer Material

A two layer material was fabricated. The above urethane layer was formed using the method set forth in Example 1. An antimony doped tin oxide filler having the tradename ZELEC® 3005-XC available from DuPont Chemicals Jackson Laboratories, Deepwater, N.J., can be mixed with a polyimide monomer (KAPTON® MT, available from DuPont) and the mixture milled to form a homogeneous dispersion. Alternatively, and as accomplished in this Example, a homogeneous dispersion of this antimony doped tin oxide/polyimide material was purchased from DuPont as DuPont designation DUPONT 300PB® and used as the outer layer. The polyimide layer was formed to a thickness of approximately 50 $\mu$m and deposited on the urethane substrate. The resistivity of the urethane layer was determined to be about $10^7$ ohms/sq.

Example 3

Three Layer Transfer System

A three layer transfer belt can be fabricated using the polyimide/ZELEC® material as prepared in Example 2. A conformable doped metal oxide/polyurethane material as prepared in Example 1 was fabricated over the polyimide/ZELEC® substrate to a thickness of about 75 μm. A silicone elastomer known as 552 (100 parts hydroxy polydimethyl siloxane with molecular weight of approximately 3500, 15 parts ethyl silicate/ethyl alcohol, 60 parts iron oxide, 60 parts MEK, and 1 part dibutyl tin diacetate) was used as the release layer and was overcoated onto the doped metal oxide/polyurethane layer to a thickness of approximately 25 μm.

The three layer system is estimated to have a resistivity of $10^{10}$ ohms/sq and an initial modulus of 500 PSI.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A transfer film component comprising a polyurethane film and electrically conductive doped metal oxide fillers, wherein said polyurethane film has a surface resistivity of from about $10^4$ to about $10^{16}$ ohm/sq.

2. The transfer film of claim 1, wherein said resistivity is from about $10^8$ to about $10^{12}$ ohm/sq.

3. The transfer film of claim 1, wherein said conductive filler is antimony doped tin oxide.

4. The transfer film of claim 1, wherein said conductive filler is present in an amount of from about 1 to about 65 percent by weight of total solids.

5. The transfer film of claim 4, wherein said conductive filler is present in an amount of from about 5 to about 10 percent by weight of total solids.

6. The transfer film of claim 1, wherein said polyurethane is the reaction product of a polyol and a diisocyanate.

7. The transfer film of claim 1, wherein said polyurethane is the reaction product of a prepolymer and a crosslinking agent.

8. The transfer film of claim 1, further comprising a substrate, wherein said polyurethane film is provided on said substrate.

9. The transfer film of claim 8, wherein said substrate comprises a material selected from the group consisting of fluoropolymers, polyimides and silicone rubbers.

10. The transfer film of claim 9, wherein said substrate comprises a fluoropolymer selected from the group consisting of polyfluoroalkoxypolytetrafluoroethylene, polytetrafluoroethylene, and fluorinated ethylenepropylene copolymer.

11. The transfer film of claim 9, wherein said substrate comprises a fluoroelastomer selected from the group consisting of a) copolymers of vinylidenefluoride, hexafluoropropylene and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene and a cure site monomer.

12. The transfer film of claim 9, wherein said substrate comprises a polyimide.

13. The transfer film of claim 8, wherein said substrate layer further comprises a conductive filler selected from the group consisting of carbon black, boron nitride and metal oxides.

14. The transfer film of claim 13, wherein said metal oxide conductive filler is iron oxide.

15. The transfer film of claim 8, further comprising an outer release layer on said polyurethane film.

16. The transfer film of claim 15, wherein said release layer comprises a polymer selected from the group consisting of fluoropolymers, ethylene propylene diene monomers, urethane nitriles, and silicone rubbers.

17. The transfer film of claim 15, wherein said substrate comprises a polymer selected from the group consisting of fluoropolymers, silicone rubbers, and polyimides, and optionally comprising a conductive filler selected from the group consisting of carbon black, boron nitride and metal oxides.

18. The transfer film of claim 1, further comprising a heating element, wherein said transfer film is in contact with said heating element in order to effect transfix capabilities to said transfer film.

19. A bias transfer member for use in an electrostatographic printing apparatus for transferring electrically charged particles from an image support surface to said biasable transfer member, wherein said biasable transfer member comprises a polyurethane film and electrically conductive doped metal oxide fillers, wherein said polyurethane film has a surface resistivity of from about $10^4$ to about $10^{16}$ ohm/sq.

20. The bias transfer member of claim 19, wherein said polyurethane film is biased by a DC bias potential.

21. The bias transfer member of claim 19, wherein said polyurethane film is biased by a DC and an AC bias potential.

22. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer film component to transfer the developed image from said charge retentive surface to a copy substrate; said transfer film component comprising a polyurethane film substrate and electrically conductive doped metal oxide fillers, wherein said polyurethane film has a surface resistivity of from about $10^4$ to about $10^{16}$ ohm/sq.

23. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a bias transfer film component for transferring electrically charged particles from said charge retentive surface to said bias transfer film component, wherein said bias transfer film component comprises a polyurethane film substrate and electrically conductive doped metal oxide fillers, wherein said polyurethane film has a surface resistivity of from about $10^4$ to about $10^{16}$ ohm/sq.

* * * * *